Oct. 28, 1958  J. P. SHANKLIN  2,858,534
MARKER BEACON RECEIVING ANTENNA
Filed Jan. 4, 1956  2 Sheets-Sheet 1

INVENTOR
JOHN P. SHANKLIN
BY Moody and Goldman
ATTORNEYS

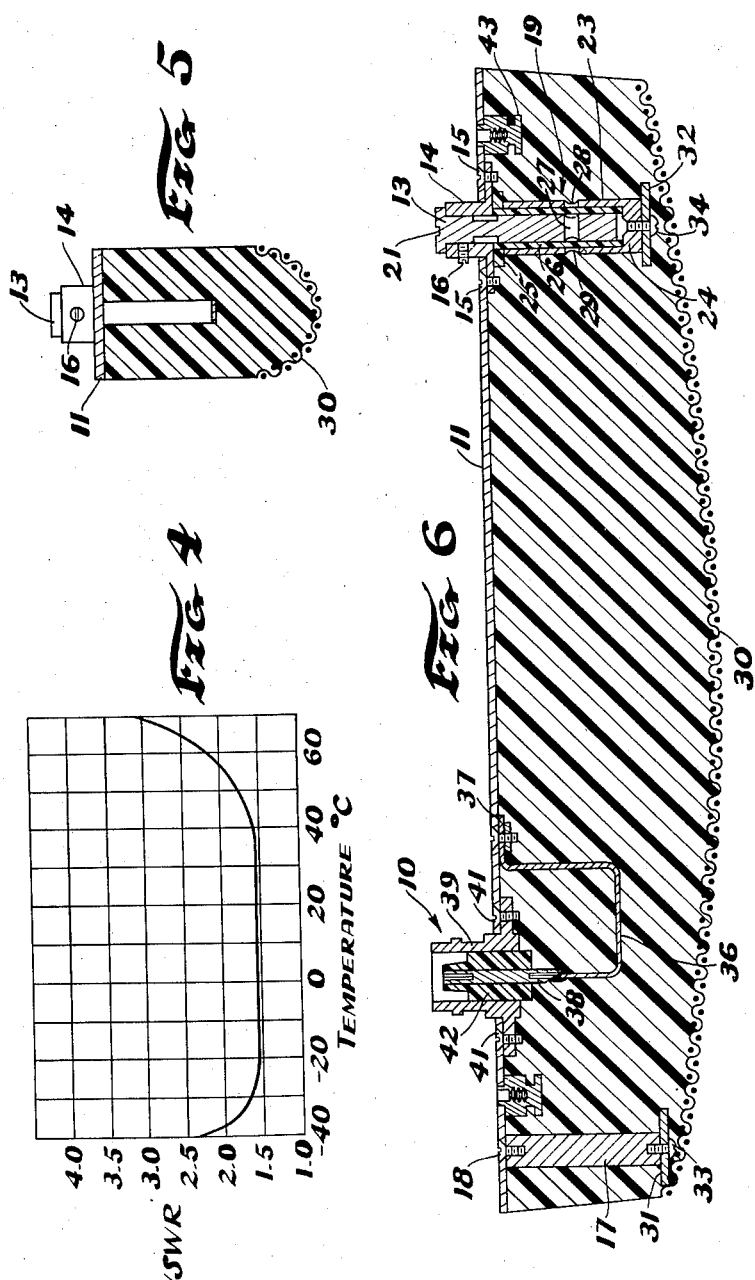

United States Patent Office 2,858,534
Patented Oct. 28, 1958

2,858,534

MARKER BEACON RECEIVING ANTENNA

John P. Shanklin, Cedar Rapids, Iowa, assignor to Collins Radio Company, Cedar Rapids, Iowa, a corporation of Iowa Application January 4, 1956, Serial No. 557,282

5 Claims. (Cl. 343—705)

This invention relates generally to very-high-frequency antennas, and relates particularly to a marker beacon receiving antenna, capable of having very small dimensions, suitable for external mounting in almost any position on high speed aircraft.

A marker antenna receives a marker-beacon signal which indicates to the pilot when his aircraft passes over a point on the earth from which is being transmitted a vertical marker-beacon radio signal, that presently operates on the assigned frequency of 75 megacycles.

Many difficulties have been encountered in the past with aircraft marker antennas. Prior antennas of the wire type were long and caused an unduly large amount of aerodynamic drag and vibration which cannot be allowed with high speed aircraft. In order to avoid the difficulties of the wire type of antenna, a cavity type was designed for aircraft, wherein a large hole was provided in the under-surface of the aircraft, within which the antenna was placed. This so-called cavity type antenna has many disadvantages; as for example, only a few places on the under side of an aircraft can permit a hole approximately one foot in diameter to be cut without materially weakening the structure of the aircraft. This greatly limits the placing of the cavity type in an aircraft and in most aircraft limits the cavity antenna to the belly-portion of the aircraft.

In large aircraft, particularly, the marker beacon radio receiver is located in a wing, due to the large amount of space available there. However, the bottoms of the wings are areas of critical stress in aircraft, and, accordingly, cannot have large holes cut in them for cavity type antennas. As a result, it is often necessary to use in excess of 75 feet of coaxial lead-in cable to connect the cavity type marker antenna to the proper radio receiver. Consequently, the signal is greatly attenuated by the long lead-in cable; and, also, the long cable acted, very undesirably, as an antenna which sometimes picked up spurious radiation that caused false marker beacon indications to the pilot and that, at times, caused disastrous navigational errors while landing an aircraft.

Furthermore, the apparent saving in aerodynamic drag by the cavity-type antenna was more apparent than real. The reinforcement of the hole, required by the cavity-type antenna in the aircraft belly, had substantial weight which loaded the aircraft and increased its drag. Also, substantial expense is involved in providing suitable cavity structures in an aircraft for the cavity-type antenna.

This invention provides a marker antenna having extremely small size and an airfoil shape which presents almost negligible drag when mounted on the exterior of an aircraft. For example, a model of the invention has 3.5 ounces of drag at 400 miles-per-hour. Also, the invention provides an antenna that has very little weight; and a model of it weighs less than 0.7 of a pound to cause negligible loading of an aircraft.

Furthermore, the invention does not require any large openings in the undersurface of an aircraft that would weaken its structure; and, therefore, it may be mounted almost anywhere on the undersurface of any aircraft, except next to projecting members which will obstruct the radiation pattern. Hence, the invention can be mounted directly below the marker-beacon receiver although the receiver is mounted in the wing of an aircraft. Accordingly, only a few feet of lead-in cable are required when the invention is used. As a result, an increase in performance is obtained because there is less attenuation of signal and less likelihood of picking up spurious response which can give false marker-beacon indications.

The invention is preferably designed in an airfoil shape and is encapsulated in a hermetically-sealing plastic material which provides a smooth aerodynamic surface. The invention includes a ground-plane member which may be mounted directly against the undersurface of an aircraft. An outer electrical component comprises a circuit that is substantially series-resonant and is connected at opposite ends to the ground-plane member. The outer loop includes a coaxial capacitor, a contoured inductance member, and a post member. The coaxial capacitor has openings in opposite plates to provide a fine tuning adjustment. An inner pick-up loop is also provided, and includes a metallic strip that connects between the ground-plane and the lead-in cable to provide an impedance-matching output connection for the antenna. The inner loop is not connected directly to the outer loop, but they are electromagnetically coupled in a manner which makes the proportioning of the inner loop non-critical in regard to providing a proper impedance match to the lead-in line, which generally will be a coaxial cable.

A broad-band effect is provided by the loop-type coupling utilized by the invention to maintain a very good impedance match during the large changes of temperature normally encountered by aircraft.

The space between the ground-plane member and the outer loop is filled with a light isocyanate plastic; which, in turn, is surrounded by a hard outer coating of an epoxy-vinyl chloride plastic. The plastic material rigidly supports the electrical members, hermetically seals them from atmospheric effects, is light in weight, and provides a smooth aerodynamic contour for the antenna structure.

Further objects, features, and advantages of this invention will become apparent to a person skilled in the art upon further study of this specification and drawings, in which:

Figure 4 is a diagram illustrating the relationship between temperature variation and the input standing-wave ratio of a model of the invention;

Figure 5 is a sectional view taken along sectional plane 5—5—5—5 in Figure 3; and Figure 6 is a cross-sectional view taken along plane 6—6—6—6 in Figure 3.

Figure 3:
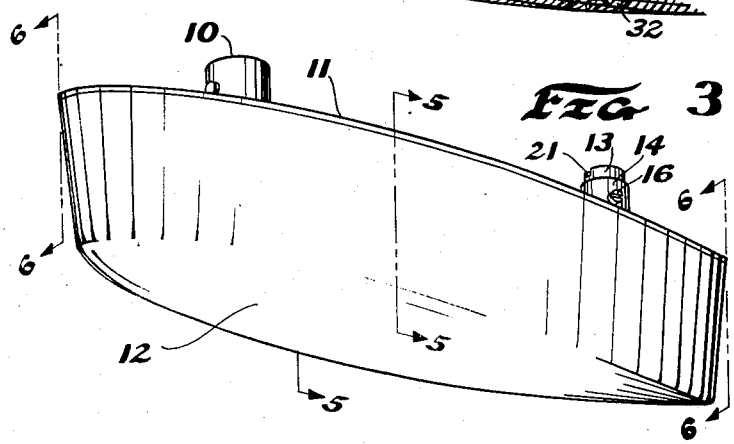
Figure 3 is an isometric view of the invention.

Now referring to the invention in more detail, Figure 3 shows the antenna as it appears in its assembled form, which includes a connector 10, that connects to a lead-in cable (not shown). Connector 10 is supported by an airfoil-shaped ground plate 11; and the remaining outer surface 12 in Figure 3 is a hard plastic substance, which might be an epoxy-vinyl chloride plastic. The other protrusion above ground plate 11 includes a slotted-head slug member 13 which enables a fine tuning adjustment for the antenna, a hub member 14 fastened to plate 11 by screws 15, and a set screw 16 that locks the tuning adjustment of member 13.

A metallic supporting post 17 extends below plate 11, and they may be fastened together by a screw 18 as shown in Figure 6.

A coaxial-type capacitor 19 extends below the opposite end of ground plate 11 through hub member 14. Slug member 13, which has slot 21 at one end, passes axially through hub 14 and provides the inner plate of the coaxial capacitor. The outer plate of coaxial capacitor 19 is a hollowed metallic member 23 that has a closed end 24. Outer plate 23 is spaced coaxially from slug 13 by a dielectric sleeve 26 and is spaced from hub 14 by a dielectric washer 25 as shown in Figure 6.

A fine adjustment in capacitance is obtained with the assistance of holes 27, 28, and 29 formed through slug 13 and outer plate 23. Slug 13 is rotatable relative to the other capacitor plate 23, and at a given rotational position slug hole 27 aligns with holes 29 and 28. Accordingly, slug opening 27 can be aligned or unaligned by rotating slug 13 and the degree of alignment of the holes provides a fine capacitance adjustment for the coaxial capacitor. Slot 21 permits a screw driver to be used to adjust the capacitance, and set screw 16 is provided to lock the position of slug 13 after it has been set.

A metallic member 30 having a streamlined outer contour may be made of woven wire, although it might be formed of plate material. Woven wire is preferable because it is easier to form, is lighter in weight, and is electrically as effective as a solid conductor.

A small mounting plate 31 is fastened across the inner surface at one end of perforated member 30, as shown in Figure 6; and they may be soldered together. Another small mounting plate 32 is received across the inner surface near the opposite end of perforated member 30; and they also may be soldered together. A screw 33 fastens front mounting plate 31 to post 17; and another screw 34 fastens the other plate 32 to the solid end 24 of outer capacitor plate 23 to thereby support member 30 with respect to the ground plane.

Coaxial capacitor 19, perforated member 30, post 17, and ground plate 11 form a substantially series-resonant circuit and comprise an outer loop circuit, which generally will be slightly detuned by the tuning adjustment of capacitor 19, for reasons that are given below.

An inner loop circuit is comprised of a narrow metallic strip 36 that is formed rectangularly and has an end portion 37 bolted to ground plate 11. The other end of metallic strip 36 is connected, by soldering for example, to the inner conductor 38 of coaxial connector 10. Connector 10 has an outer conducting portion 39 which is fastened to plate 11 by screws 41 and is separated from inner conductor 38 by a dielectric member 42.

A plurality of mounting nuts 43 are fastened to the lower side of ground plate 11, and they receive small bolts (not shown) which may be projected through the undersurface of an aircraft to fasten the invention to the aircraft.

The volume between perforated member 30 and grounding plate 11 is filled with a light porous plastic material, which might be an isocyanate plastic, that in turn is covered with the hard outer plastic, which provides the outer surface of the antenna structure.

The upper surface of grounding plate 11 may be received against the undersurface of an aircraft at virtually any desired position on the aircraft. It can be seen that the only holes that must be drilled through the aircraft surface are the holes for connector 10, hub 14, and the mounting bolts. The holes for connector 10 and hub 14 are of the order of approximately one-half inch, and the bolts, which engage mounting nuts 43, require holes of the order of one-quarter of an inch. The openings thereby required in the skin of an aircraft are of such small size as to have substantially no effect upon the surface strength of the aircraft.

Figure 1:
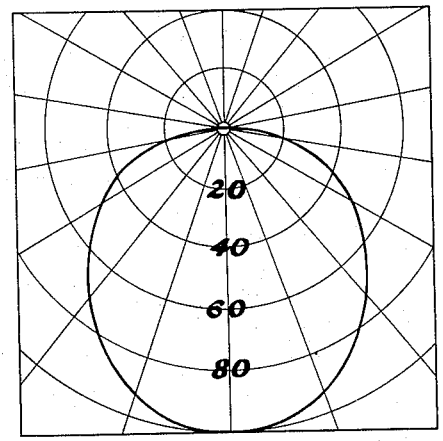
Figure 1 is a polar radiation pattern that illustrates the response of the invention.
Figure 2:
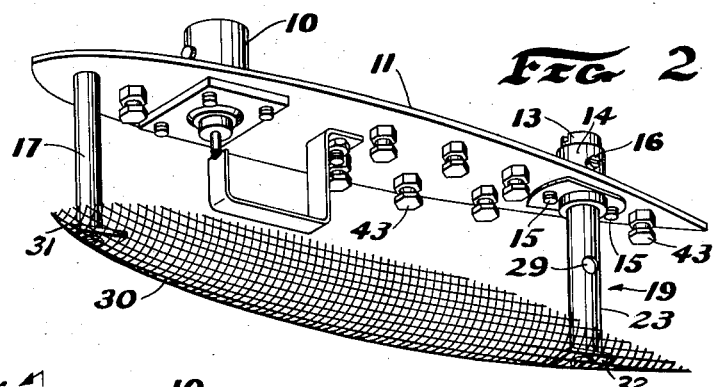
Figure 2 is an isometric view of the internal members utilized by the invention.

When the invention is mounted on the under side of an aircraft, it will approximately have a radiation pattern, that is, a solid-of-revolution of the pattern shown in Figure 1.

The outer-loop circuit is made substantially series-resonant by the inductance caused by the outer diameters of post 17 and capacitor 19 and the average width of screen member 30, and the capacitance of capacitor 19, and the distributed capacitance between screen member 30 and grounding plate 11; although the distributed capacitance is minor compared to the capacitance of coaxial capacitor 19.

The outer loop is initially proportioned to nearly provide it with a series-resonant condition, and a final adjustment in the series-resonant condition is obtained by rotating slug 13.

When slug 13 is rotated so that holes 27, 28, and 29 in the coaxial capacitor are in alignment, capacitor 19 provides its maximum capacitance. On the other hand, when the holes are completely out of alignment, the capacitor provides its minimum capacitance, due to the fact that the common area of the capacitor plates is reduced. Thus, a small and controllable variation in capacitance is obtained by varying the alignment of the holes in the inner and outer plates; and the resonant frequency of the outer loop can thus be finely adjusted.

The inner loop circuit provided by strip 36 is untuned and is primarily inductive. Accordingly, the outer loop circuit may be slightly detuned, so that it reflects a capacitive impedance to the inner loop circuit to resonate with the inductance of the inner loop. Consequently, a resonant effect is obtained at the antenna output (which is at connector 10) and a broadband frequency response is found to result that prevents expansions and contractions of antenna elements, due to large temperature changes, from substantially affecting the tuning of the antenna. This may be observed from Figure 4, which shows the relation between temperature variation and impedance match at the antenna output for a model of the invention.

The output impedance of the antenna is also related to the ratio of the enclosed area of the outer-loop circuit to the enclosed area within the inner loop circuit. Hence, the size of the inner loop may be varied, in designing an antenna according to this invention, to adjust the output impedance of the antenna without varying the outside dimensions of the antenna. Large tolerance variations are permissible in sizing metallic strip 36 without having a large adverse effect upon the output impedance. This permits economy in producing antennas made according to this invention.

The external dimensions of a model of this invention designed to receive a 75 megacycle signal are less than one foot in length, less than one and one-half inches wide at its widest point, and less than two and one-quarter inches high at its highest point. The model weighed 0.69 pound, and it had a drag of 3.5 ounces at 400 miles-per-hour indicated air speed.

It is, therefore, apparent that this invention provides a marker antenna with exceptional versatility, which can be mounted in any desired location on an aircraft without interfering with the aircraft structure or its aerodynamics, and which will maintain a very low and substantially constant impedance match over extreme temperature variations.

While a particular form of the invention has been described by this specification, it will be obvious to a person skilled in this art that the invention is capable of modification. Changes, therefore, in the construction and arrangement of the invention may be made without departing from the scope of the invention as given by the appended claims.

I claim:

1. A marker beacon receiving antenna comprising a first elongated metallic ground plate member, a metallic supporting post fixedly extending from an end portion of said ground-plate member, a capacitor fastened on one side to the opposite end portion of said elongated member, a second elongated metallic member fastened near one end to said post and fixed near its other end to said capacitor, said post member and said second elongated member and said capacitor together forming a nearly series-resonant circuit in conjunction with said plate member, an inner loop fixed at one end to said plate member and extending within said series-resonant circuit, and a coaxial connector having its outer conductor fastened to said plate member and having its inner conductor connected to the other end of said inner loop.

2. A marker beacon receiving antenna comprising an airfoil shaped mounting plate of conducting material, a coaxial capacitor having one end fastened to said plate, a metallic post member also having one end fastened to said plate and extending on the same side of said plate as said coaxial capacitor, a metallic member formed with an airfoil contour and fastened electrically and mechanically to the other ends of said coaxial capacitor and said post member, a coaxial connector extending from the opposite side of said plate and having its outer conductor fastened to said plate, an impedance matching inner loop having a portion located adjacent to said contoured member with one end connected to the inner conductor of said coaxial connector and its other end fastened to said mounting plate, said coaxial capacitor adjusted to substantially provide the required impedance match at the output of said coaxial capacitor, wherein a broadband impedance match is provided which permits wide variations in temperature without substantial mismatching effects.

3. A marker beacon receiving antenna comprising an airfoil shaped mounting plate of conducting material, a coaxial connector supported through an opening in said plate with its outer connector connected to said plate; an outer loop circuit including a perforated member of conducting material having an airfoil contour, a metallic post fixed between adjacent portions of said plate and said perforated member, and a coaxial capacitor adjustably fixed between other adjacent portions of said plate and said perforated member; an inner loop member extending within said outer loop and fixed at one end to said plate and fastened at its other end to the inner conductor of said coaxial connector, the volume between said perforated member and said plate filled with a light isocyanate plastic, an epoxy-vinyl chloride plastic surrounding the above-named elements and formed with an airfoil contour, wherein a hard outer surface hermetically seals said antenna, and said capacitor adjusted to obtain a broadband impedance match at the terminal provided by said coaxial capacitor.

4. A marker beacon receiving antenna comprising a thin airfoil shaped ground-plate member, a streamlined shaped radio-wave pickup member situated approximately parallel to said ground member, a metallic post member fastened mechanically and electrically between adjacent ends of said plate member and said pickup member, a capacitor electrically connecting between other adjacent portions of said ground-plate member and said pickup member, a coaxial connector supported through an opening in said ground-plate member, an inner loop member formed rectangularly of metallic material and fastened at one end to said ground-plate member and connected at its opposite end to the inner conductor of said coaxial connector, the volume between said ground-plate member and pickup member being filled with a light isocyanate plastic, and a hard outer coating of epoxy-vinyl chloride surrounding the antenna to provide a hermetically-sealing aerodynamic surface, said capacitor adjusted to obtain a broad-band impedance match at the output of said coaxial capacitor.

5. A marker beacon receiving antenna comprising a ground-plate member formed with an airfoil shape, a screen member having an airfoil outer contour and situated on one side of said ground-plate member, a post member of metallic material electrically and mechanically fastening together one end of said screen member to one end of said ground-plate member, a hub supported through an opening in said ground-plate member, a slug member of conducting material supported rotatably through said hub and having an exposed slotted portion for rotating said slug member, a sleeve member of insulating material surrounding said slug member, an insulating washer surrounding said insulating sleeve and received against said hub, a metallic sleeve received about said insulating sleeve member and against said insulating washer, the opposite end of said metallic sleeve fastened to said screen member, a coaxial capacitor formed of said slug and metallic sleeve with small openings formed through them, said openings capable of being aligned as said slug is rotated, an impedance matching loop comprising a rectangularly shaped metallic member having one end fastened to said ground-plate member, a coaxial connector supported through said ground-plate member with its inner conductor fastened to the other end of said impedance matching loop, and its outer conductor fastened to said ground-plate member, said slug member rotated to a position that obtains a broad-band impedance match at said coaxial connector, a set screw provided in said hub to engage and lock the position of said slug member, a light isocyanate plastic provided in the volume between said screen member and ground-plate member, and a hard epoxy-vinyl chloride plastic surrounding the antenna members to provide a hermetically sealing smooth aerodynamic contour for the antenna structure, whereby said antenna is relatively small and has little weight and aerodynamic drag at the marker beacon frequency of 75 megacycles.

No references cited.